(12) United States Patent
Sugita

(10) Patent No.: US 9,607,054 B2
(45) Date of Patent: Mar. 28, 2017

(54) DISPLAYING LIST OF MULTIPLE CONTENTS

(71) Applicant: CANON KABUSHIKI KAISHA, Tokyo (JP)

(72) Inventor: Norio Sugita, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 728 days.

(21) Appl. No.: 14/043,386

(22) Filed: Oct. 1, 2013

(65) Prior Publication Data

US 2014/0101138 A1    Apr. 10, 2014

(30) Foreign Application Priority Data

Oct. 10, 2012   (JP) .................................. 2012-225021

(51) Int. Cl.
*G06F 17/30* (2006.01)
*G06F 3/0482* (2013.01)

(52) U.S. Cl.
CPC ...... *G06F 17/30554* (2013.01); *G06F 3/0482* (2013.01); *G06F 17/3005* (2013.01)

(58) Field of Classification Search
CPC ........................ G06F 3/04842; G06F 17/30554
See application file for complete search history.

(56) References Cited

U.S. PATENT DOCUMENTS

2006/0224604 A1   10/2006   Landsman et al.
2010/0281084 A1*  11/2010   Gupta ............... G06F 17/30274
                                                       707/822

FOREIGN PATENT DOCUMENTS

JP   2004-255740 A   9/2004
JP   2008-176658 A   7/2008

OTHER PUBLICATIONS

The above patent documents were cited in the Jul. 19, 2016 Japanese Office Action, that issued in Japanese Patent Application No. 2012225021.

* cited by examiner

*Primary Examiner* — Alexey Shmatov
(74) *Attorney, Agent, or Firm* — Cowan, Liebowitz & Latman, P.C.

(57) ABSTRACT

An information processing apparatus which makes it possible to easily find a page on which a desired content is allocated when many contents are displayed separately on a plurality of pages. Contents are classified into a plurality of groups based on attribute information on the contents. One tab is selected from among a displayed plurality of tabs corresponding to the groups. Contents in a group corresponding to the selected tab are displayed in a predetermined display area. The attribute information on the contents is displayed near the plurality of tabs. First attribute information on a first content in a first group corresponding to a first tab and second attribute information on a second content in a second group corresponding to a second tab displayed next to the first tab are compared, and based on a comparison result, the second attribute information is displayed near the second tab.

5 Claims, 7 Drawing Sheets

| IMAGE FILE NAME | IMAGE NAME | CREATION DATE AND TIME | REGISTRATION DATE AND TIME |
|---|---|---|---|
| IMG_0001.JPG | Img 01 | 2011-11-12 23:48 | 2011-11-13 23:48 |
| IMG_0002.JPG | Img 02 | 2011-11-12 10:12 | 2011-11-13 23:48 |
| IMG_0003.JPG | Img 03 | 2011-11-12 13:08 | 2011-11-13 23:49 |
| IMG_0004.JPG | Img 04 | 2011-11-13 21:15 | 2011-11-13 23:49 |
| IMG_0005.JPG | Img 05 | 2011-11-13 22:20 | 2011-11-13 23:50 |
| IMG_0006.JPG | Img 06 | 2011-11-13 23:25 | 2011-11-13 23:50 |
| IMG_0007.JPG | Img 07 | 2011-11-14 9:30 | 2011-11-15 22:29 |
| IMG_0008.JPG | Img 08 | 2011-11-14 9:40 | 2011-11-15 22:29 |
| IMG_0009.JPG | Img 09 | 2011-11-14 9:55 | 2011-11-15 22:29 |
| IMG_0010.JPG | Img 10 | 2011-11-15 8:20 | 2011-11-15 22:30 |
| IMG_0011.JPG | Img 11 | 2011-11-15 8:40 | 2011-11-15 22:30 |
| IMG_0012.JPG | Img 12 | 2011-11-15 9:50 | 2011-11-15 22:30 |
| IMG_0013.JPG | Img 13 | 2011-11-20 8:10 | 2011-11-20 21:22 |
| IMG_0014.JPG | Img 14 | 2011-11-20 9:40 | 2011-11-20 21:23 |
| IMG_0015.JPG | Img 15 | 2011-11-20 10:50 | 2011-11-20 21:23 |
| IMG_0016.JPG | Img 16 | 2011-11-20 11:20 | 2011-11-20 21:23 |
| IMG_0017.JPG | Img 17 | 2011-11-23 8:40 | 2011-11-23 22:15 |
| IMG_0018.JPG | Img 18 | 2011-11-23 9:50 | 2011-11-23 22:15 |
| IMG_0019.JPG | Img 19 | 2011-11-23 10:40 | 2011-11-23 22:16 |
| IMG_0020.JPG | Img 20 | 2011-11-23 11:50 | 2011-11-23 22:16 |

DISPLAYING LIST OF MULTIPLE CONTENTS

BACKGROUND OF THE INVENTION

Field of the Invention

The present invention relates to an information processing apparatus capable of displaying a list of a plurality of contents, a control method therefor, and a computer-readable storage medium storing a program for implementing the control method.

Description of the Related Art

In recent years, it has become possible for individuals to easily create or obtain digital contents (hereafter referred to as "contents") such as still images and moving images. Accordingly, individuals have come to manage a large amount of contents.

When a user views a large amount of contents using an information processing apparatus, a method in which contents are placed on one page and scrolled is generally used, but according to this method, it is difficult to know where a desired content is. Moreover, the intervals on a page between attribute information such as dates and hours and file names which are used in sorting contents are short, and hence many contents are scrolled even by scrolling a small amount. As a result, not only it is difficult for a user to perform operations for finding a desired content, but also the user may lose track of a desired content.

Accordingly, there has been proposed a method in which a list of a large amount of contents is displayed on a plurality of pages so that a user can find a desired content by switching pages (see Japanese Laid-Open Patent Publication (Kokai) No. 2008-176658).

However, when a large amount of contents are divided into a plurality of pages and placed side by side on the pages as with the technique described in Japanese Laid-Open Patent Publication (Kokai) No. 2008-176658, it is not easy to recognize where a desired content is placed on which page.

SUMMARY OF THE INVENTION

The present invention provides an information processing apparatus, which makes it possible to easily find a page on which a desired content is stored in a case where a large amount of contents are displayed separately on a plurality of pages, a control method therefor, and a computer-readable storage medium storing a program for implementing the control method.

Accordingly, a first aspect of the present invention provides an information processing apparatus comprising a classification unit configured to classify a plurality of contents into a plurality of groups based on attribute information on the plurality of contents, a tab display unit configured to display a plurality of tabs corresponding to the plurality of groups, a selection unit configured to select one tab from among the displayed plurality of tabs, a content display unit configured to display, in a predetermined display area, contents belonging to a group corresponding to the tab selected by the selection unit among the plurality of contents, and a comparison unit configured to compare the attribute information on the plurality of contents, wherein the tab display unit displays, near respective ones of the plurality of tabs, the attribute information on the plurality of contents classified into the plurality of group, the comparison unit compares first attribute information on a first content classified into a first group corresponding to a first tab and second attribute information on a second content classified into a second group corresponding to a second tab, which is displayed next to the first tab, with each other, and based on a result of the comparison, the tab display unit displays the second attribute information on the second content near the second tab.

Accordingly, a second aspect of the present invention provides an information processing apparatus comprising a separation unit configured to separate a plurality of contents into a predetermined number of groups based on time information on the plurality of contents, a tab display unit configured to display a predetermined number of tabs corresponding to the predetermined number of groups, a selection unit configured to select one tab from among the displayed predetermined number of tabs, and a content display unit configured to display, in a predetermined display area, a content included in a group corresponding to the selected tab among the plurality of contents, wherein the tab display unit displays, near respective ones of the predetermined number of tabs, time information on respective contents included in the predetermined number of groups corresponding to the predetermined number of tabs.

Accordingly, a third aspect of the present invention provides a control method for an information processing apparatus, comprising a classification step of classifying a plurality of contents into a plurality of groups based on attribute information on the plurality of contents, a tab display step of displaying a plurality of tabs corresponding to the plurality of groups, a selection step of selecting one tab from among the displayed plurality of tabs, a content display step of displaying, in a predetermined display area, contents belonging to a group corresponding to the tab selected in the selection step among the plurality of contents, and a comparison step of comparing the attribute information on the plurality of contents, wherein in the tab display step, the attribute information on the plurality of contents classified into the plurality of group is displayed near respective ones of the plurality of tabs, in the comparison step, first attribute information on a first content classified into a first group corresponding to a first tab and second attribute information on a second content classified into a second group corresponding to a second tab, which is displayed next to the first tab, are compared with each other, and based on a result of the comparison, the second attribute information on the second content is displayed near the second tab.

Accordingly, a fourth aspect of the present invention provides a control method for an information processing apparatus, comprising a separation step of separating a plurality of contents into a predetermined number of groups based on time information on the plurality of contents, a tab display step of displaying a predetermined number of tabs corresponding to the predetermined number of groups, a selection step of selecting one tab from among the displayed predetermined number of tabs, and a content display step of displaying, in a predetermined display area, a content included in a group corresponding to the selected tab among the plurality of contents, wherein in the tab display step, time information on respective contents included in the predetermined number of groups corresponding to the predetermined number of tabs is displayed near respective ones of the predetermined number of tabs.

Accordingly, a fifth aspect of the present invention provides a non-transitory computer-readable storage medium storing a program for causing a computer to execute a control method for an information processing apparatus, the control method comprising a classification step of classifying a plurality of contents into a plurality of groups based on attribute information on the plurality of contents, a tab display step of displaying a plurality of tabs corresponding to the plurality of groups, a selection step of selecting one tab from among the displayed plurality of tabs, a content display step of displaying, in a predetermined display area, contents belonging to a group corresponding to the tab selected in the selection step among the plurality of contents, and a comparison step of comparing the attribute information on the plurality of contents, wherein in the tab display step, the attribute information on the plurality of contents classified into the plurality of group is displayed near respective ones of the plurality of tabs, in the comparison step, first attribute information on a first content classified into a first group corresponding to a first tab and second attribute information on a second content classified into a second group corresponding to a second tab, which is displayed next to the first tab, are compared with each other, and based on a result of the comparison, the second attribute information on the second content is displayed near the second tab.

Accordingly, a sixth aspect of the present invention provides a non-transitory computer-readable storage medium storing a program for causing a computer to execute a control method for an information processing apparatus, the control method comprising a separation step of separating a plurality of contents into a predetermined number of groups based on time information on the plurality of contents, a tab display step of displaying a predetermined number of tabs corresponding to the predetermined number of groups, a selection step of selecting one tab from among the displayed predetermined number of tabs, and a content display step of displaying, in a predetermined display area, a content included in a group corresponding to the selected tab among the plurality of contents, wherein in the tab display step, time information on respective contents included in the predetermined number of groups corresponding to the predetermined number of tabs is displayed near respective ones of the predetermined number of tabs.

According to the present invention, erroneous operations against user's intensions in multi-touch operations can be prevented.

Further features of the present invention will become apparent from the following description of exemplary embodiments (with reference to the attached drawings).

DESCRIPTION OF THE EMBODIMENTS

The present invention will now be described in detail with reference to the drawings showing an embodiment thereof.

Figure 1:
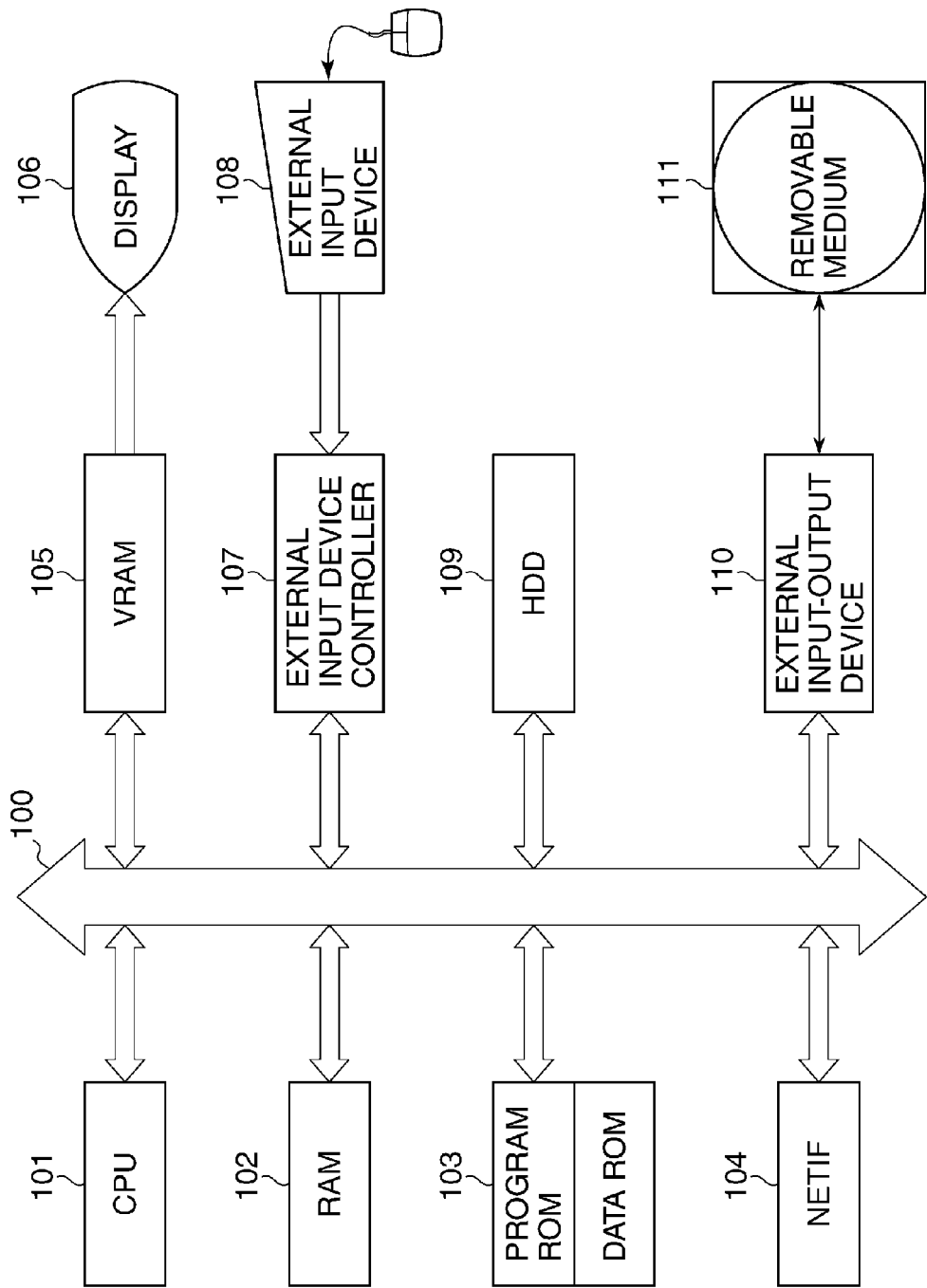
FIG. 1 is a block diagram schematically showing an arrangement of an information processing apparatus according to an embodiment of the present invention.

FIG. 1 is a block diagram schematically showing an arrangement of an information processing apparatus according to an embodiment of the present invention. The information processing apparatus appearing in FIG. 1, which is a so-called personal computer, has a transmission bus 100, a CPU 101, a RAM 102, a ROM 103, a NETIF 104, a VRAM 105, and a display 106. The information processing apparatus also has an external input device controller 107, an external input device 108, an HDD 109, and an external input-output device 110, to and from which a removable medium 111 can be attached and removed.

The CPU 101 is a central processing unit that controls the information processing apparatus by performing various computations for operating the information processing apparatus. The RAM 102 acts as main memory for the CPU 101 and also as an expansion area, an execution area, and data area for programs to be executed. Various programs to be executed by the CPU 101 and data required to execute the programs are stored in the ROM 103. The ROM 103 is comprised of program ROM, in which basic software (OS) as a system program for controlling the information processing apparatus is stored, and data ROM, in which information or the like required to operate the information processing apparatus is stored. It should be noted that the HDD 109 may be used in place of the ROM 103.

The NETIF 104 is a network interface that provides control to transfer data between a network (not shown) and the information processing apparatus and diagnoses connection statuses. The VRAM 105 expands contents, which are to be displayed on a screen of the display 106, and controls display thereof. The display 106 is a display device such as a liquid crystal display (LCD). The external input device controller 107 controls input signals from the external input device 108. The external input device 108 is a pointing device for receiving operations performed by a user, for example, a keyboard, a mouse, or a touch panel provided on the display 106.

The HDD 109 is a storage medium for use in storing application programs and various types of data. It should be noted that application programs in the present embodiment mean software programs (modules) or the like for executing various types of information processing including a display control process, to be described later, carried out by the information processing apparatus.

In accordance with instructions from the CPU 101, the external input-output device 110 reads and writes data from and into the removable medium 111. The removable medium 111 is, for example, a magnetic recording medium (such as a flexible disk or an external hard disk), an optical recording medium (such as a CD (DVD)-R or a CD(DVD)-RW), a magneto optical recording medium (such as an MO), or a semiconductor recording medium (such as a memory card). It should be noted that application programs and data stored in the HDD 109 may be stored in the removable disk 111. The transmission bus 100 is an address bus, a data bus, an input-output bus, and a control bus for transmitting data between the above described component elements which the information processing apparatus has.

Figure 2:
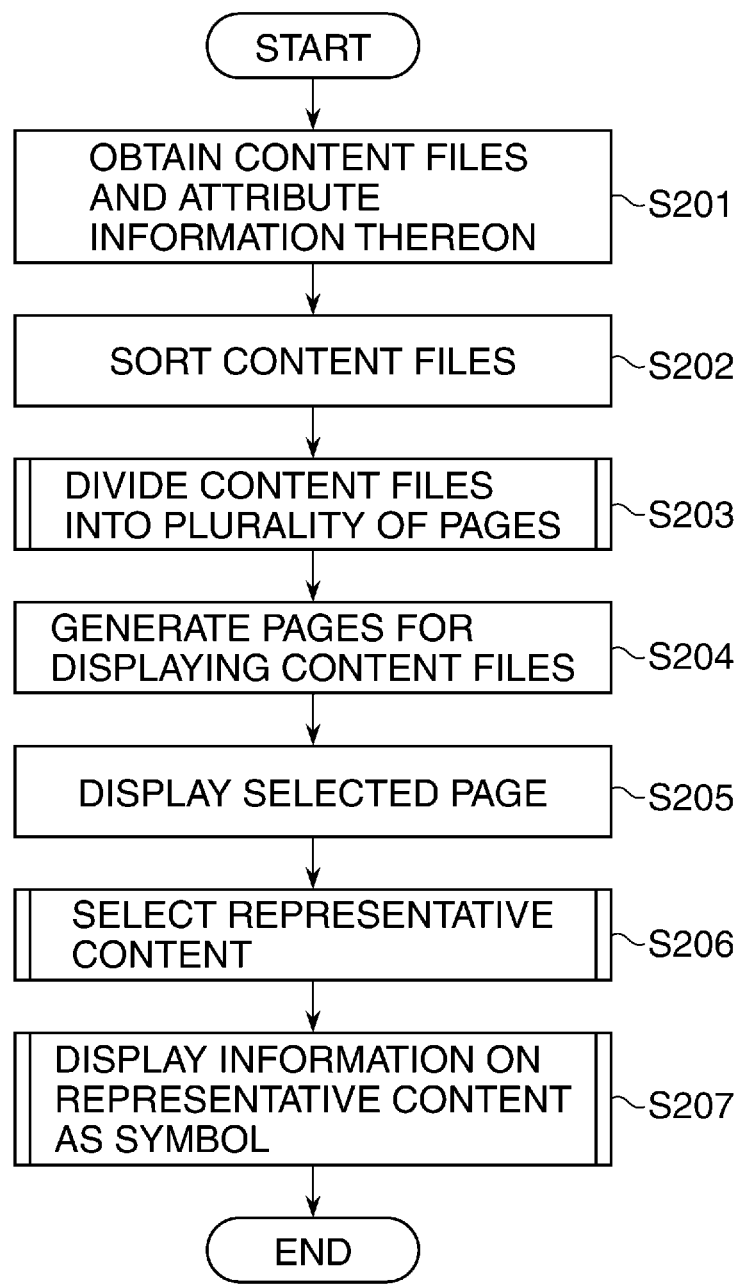
FIG. 2 is a flowchart of a content display process carried out by the information processing apparatus appearing in FIG. 1.

FIG. 2 is a flowchart of a content display process carried out by the information processing apparatus appearing in FIG. 1. In the present embodiment, an application program, which is comprised of a plurality of modules, is loaded from the ROM 103 or the HDD 109, or from the removable medium 111 via the external input-output device 110, expanded into the RAM 102, and executed by the CPU 101. As a result, processes in the flowchart of FIG. 2 are realized. Content files including moving image data, still image data, and audio data, and attribute information on the content files (for example, file names, content names, and creation dates and times (shooting dates and times when contents are still images or moving images), and registration dates and times) are stored (saved) in the HDD 109.

An application program is automatically started when predetermined conditions are satisfied in the information processing apparatus, or started as the need arises based on information input from the external input device 108 via the external input device controller 107. Information (data) obtained through execution of an application program by the CPU 101 is stored in the RAM 102, the VRAM 105, the HDD 109 or the removable medium 111 as the need arises. At the same time, the data stored in the VRAM 105 is displayed as an image on the display 106.

Referring to the flowchart of FIG. 2, in step S201, the CPU 101 obtains content files and content attribute information which is comprised of content file names, content names, creation dates and times, and registration dates and times. It should be noted that a content file and content attribute information may be associated with each other and individually managed, or content attribute information may be included in a content file.

In step S202, the CPU 101 sorts content files by any of content attribute information such as content file name, content name, creation date and time, and registration date and time. Then, in step S203, the CPU 101 divides contents files to be displayed into a plurality of groups and displays the contents files in predetermined page display areas in each group. It should be noted that the page dividing process in the step S203 will be described later in detail with reference to FIG. 3.

In step S204, the CPU 101 creates display pages for displaying, on each page, reduced images representing content files. It should be noted that data for creating the display pages in the step S204 may be created in advance for all the pages, or at the time of receiving an instruction, may be created for the corresponding page.

Then, in step S205, the CPU 101 displays a selected page (in an initial state, a first page) on the display 106. It should be noted that when reduced images of all content files included in one page cannot be displayed within a screen display area of the display 106, reduced images relating to some of content files belonging to the page may be selectively displayed by scrolling the screen. Even with this arrangement, selectively displaying reduced images by scrolling is not difficult because the number of content files assigned to each page is considerably smaller than the total number of content files to be displayed.

Then, in step S206, the CPU 101 selects a content that is to be a representative (hereafter referred to as the "a representative content") from among a plurality of content files in the page based on content attribute information. Also, the CPU 101 holds content attribute information on the representative content (hereafter referred to as "representative content attribute information") on the RAM 102. The representative content selection process in the step S206 will be described later in detail with reference to FIG. 4.

Figure 3:
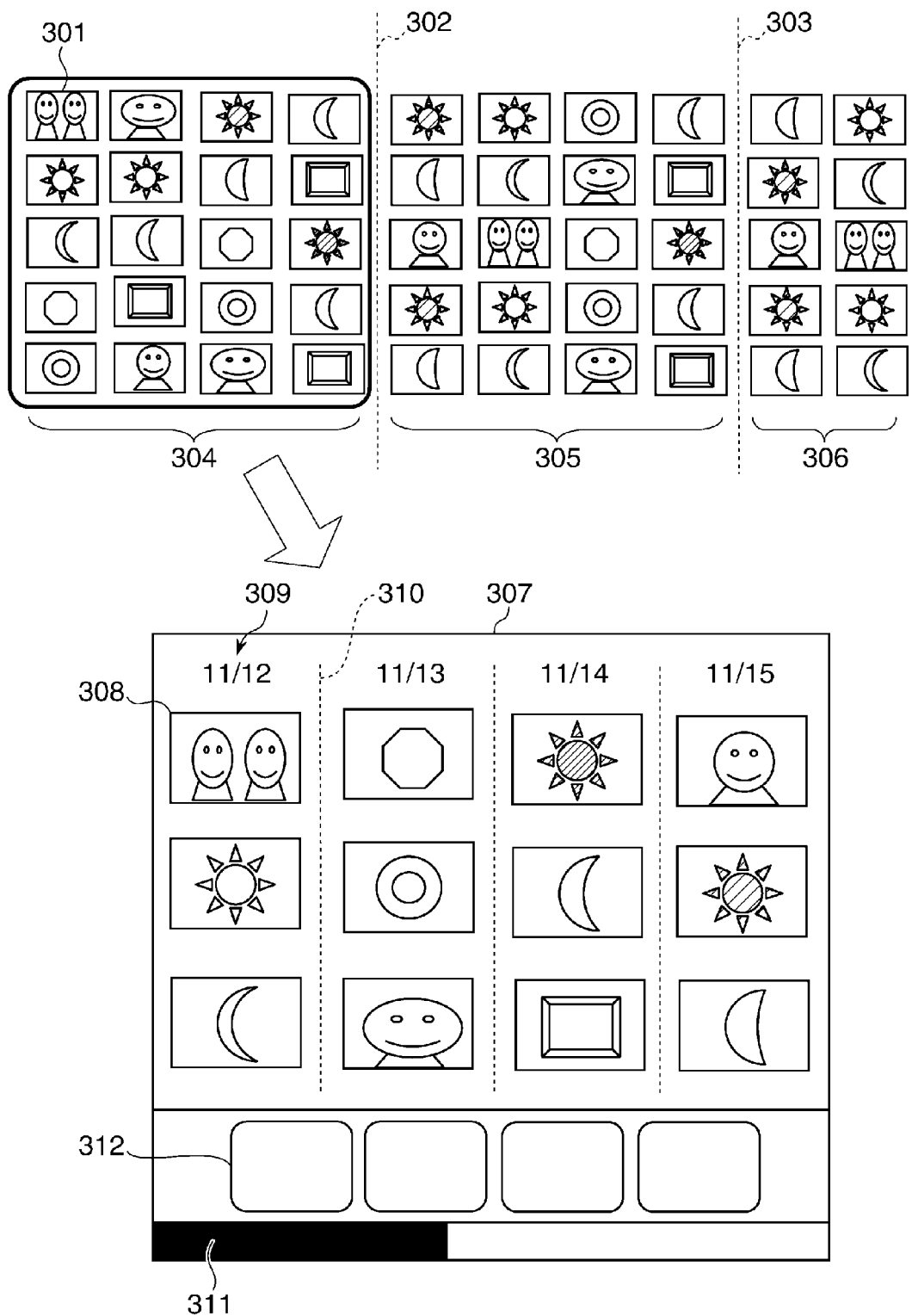
FIG. 3 is a diagram schematically showing the details of a page dividing process in step S203 appearing in FIG. 2.

Then, in step S207, the CPU 101 displays representative content attribute information held on the RAM 102 as symbols in a manner being superposed on page switching tabs 312 (see FIG. 3). The symbol display process in the step S207 will be described later in detail with reference to FIGS. 5 and 6.

FIG. 3 is a diagram schematically showing details of the page dividing process in the step S203 appearing in FIG. 2. Here, content files to be displayed are image files (still images). The CPU 101 counts the number of all the content files to be displayed and divides the plurality of content files into pages such that a predetermined number of content files are displayed on one page. In an upper column of FIG. 3, there is shown an example in which contents (images) 301 relating to content files sorted by date and time of image taking which correspond to creation date and time of a content file are divided into groups such that twenty images are displayed on one page, and allocated to the respective pages. It should be noted that the contents 301 do not represent any specific images shown in the upper column of FIG. 3 but represent respective images shown in the upper column of FIG. 3.

A boundary line 302 appearing in the upper column of FIG. 3 represents a boundary between the first page and the second page, and a boundary line 303 appearing in the upper column of FIG. 3 represents a boundary between the second page and the third page. A content group (image group) 304, a content group 305, and a content group 306 (only ten images are shown) are displayed on the first page, the second page, and the third page, respectively, and when there are subsequent pages, images are displayed in the same way.

The CPU 101 displays contents on a selected page as a content display screen 307, which is appearing in the lower column of FIG. 3, on the display 106. In the lower column of FIG. 3, there is shown an exemplary screen layout in which the content group 304 on the first page is displayed as the content display screen 307 in an initial state. In the present embodiment, beginning at a first (upper left) content 308 on the first page, contents 301 are placed in the state of being separated with date boundary lines 310 according to dates of creation (shooting dates) 309.

In the present embodiment, because there are many contents 301 that should be displayed, the contents 301 are displayed while shifting the screen display area using a scroll bar 311. When the contents 301 are divided into a plurality of pages, the CPU 101 displays the page switching tabs 312. The user can switch pages by selecting corresponding page switching tabs 312 using the external input device 108.

It should be noted that although in the above description, images (still images) are taken up as the contents 301, the contents 301 are not limited to them but may be character strings, symbols, moving images, and so on. Also, the contents 301 may be sorted by not only creation date and time but also other attributes such as registration date and time, file name, and size. Further, contents are displayed separately using the dates of creation (dates of shooting) 309, but another unit such as "week" or "year" may be used in place of "date". The scroll bar 311 may be not only horizontal but also vertical. Although pages are switched using the page switching tabs 312, but other methods using links or input of page numbers may be used.

Figure 4:
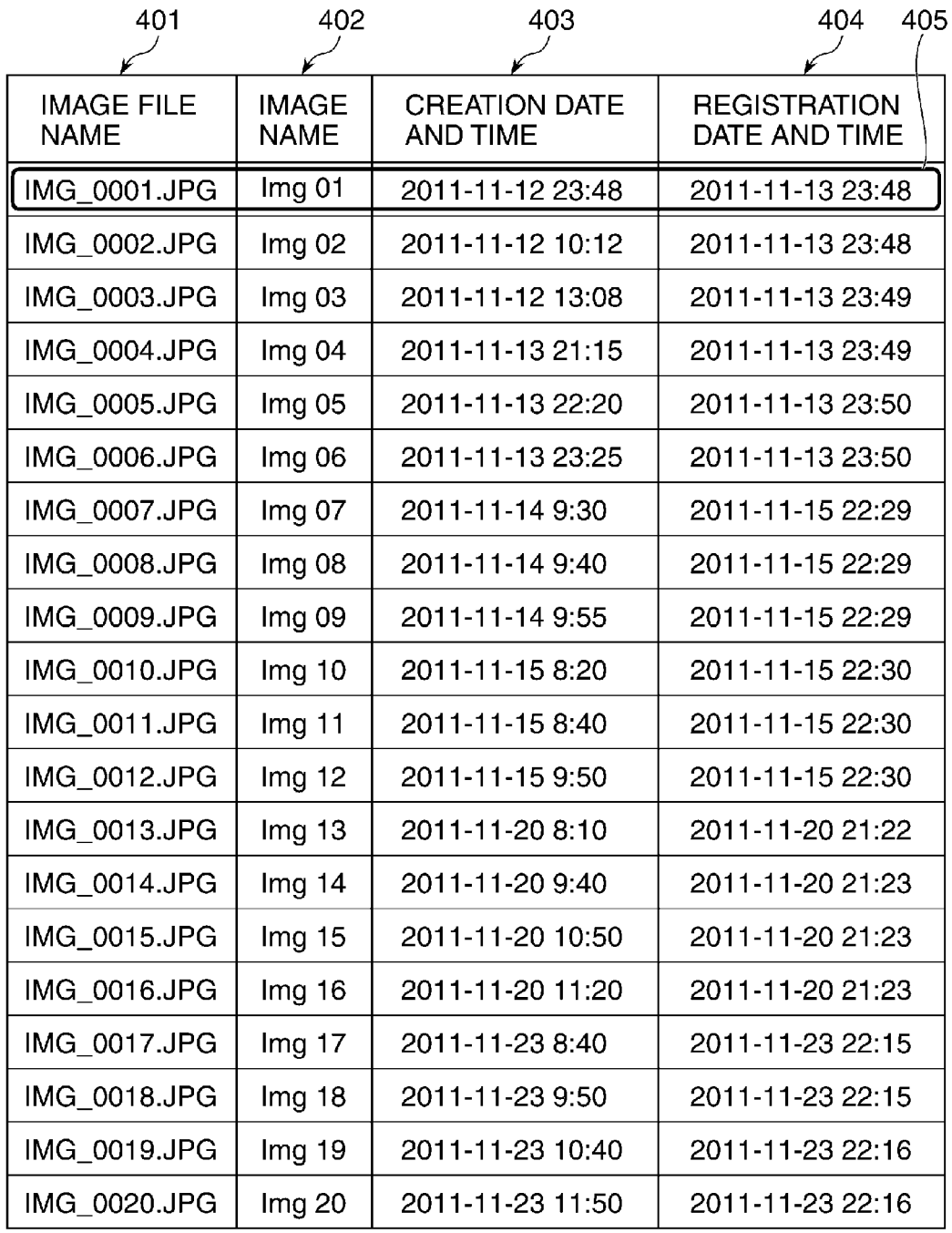
FIG. 4 is a diagram schematically showing the details of a representative content selection process in step S206 appearing in FIG. 2.

FIG. 4 is a diagram schematically showing details of the representative content selection process in the step S206. Here as well, contents are images (still images) as with FIG. 3. Based on content attribute information, the CPU 101 selects a representative content (a reduced image indicative thereof) 405 from contents (images) within a page. Here, the content attribute information includes content file name (image file name) 401, content name (image name) 402, creation date and time (shooting date and time) 403, and registration date and time 404, and based on at least one of them, the representative content 405 is selected. Then, the CPU 101 causes the RAM 102 to hold attribute information on the selected representative content 405 (representative content attribute information).

Referring to FIG. 4, a first content is selected as a representative content from among contents on a first page among pages sorted in ascending order by creation date and time. On other pages, a representative content is selected in the same way as on the first page. A content whose creation date and time is the first should not necessarily be selected as a representative content from among contents on each page, but the last content or any other content that satisfies arbitrary conditions may be selected as a representative content. A plurality of contents displayed on one page may be sorted using other attribute information such as content file name, content name, and registration date and time.

Figure 5:
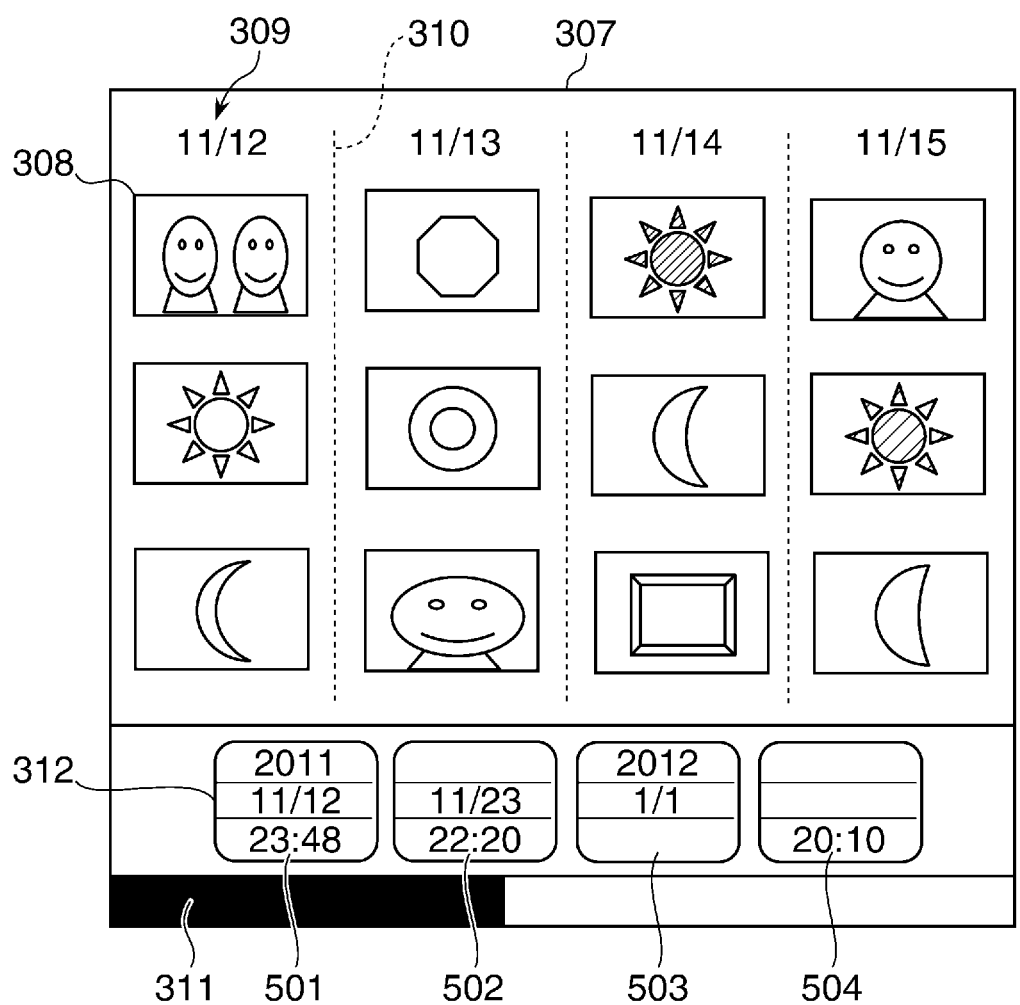
FIG. 5 is a diagram showing a display example in which the creation date and time of a representative content is used as a page switching symbol in a page switching symbol display process in step S207 appearing in FIG. 2.
Figure 6:
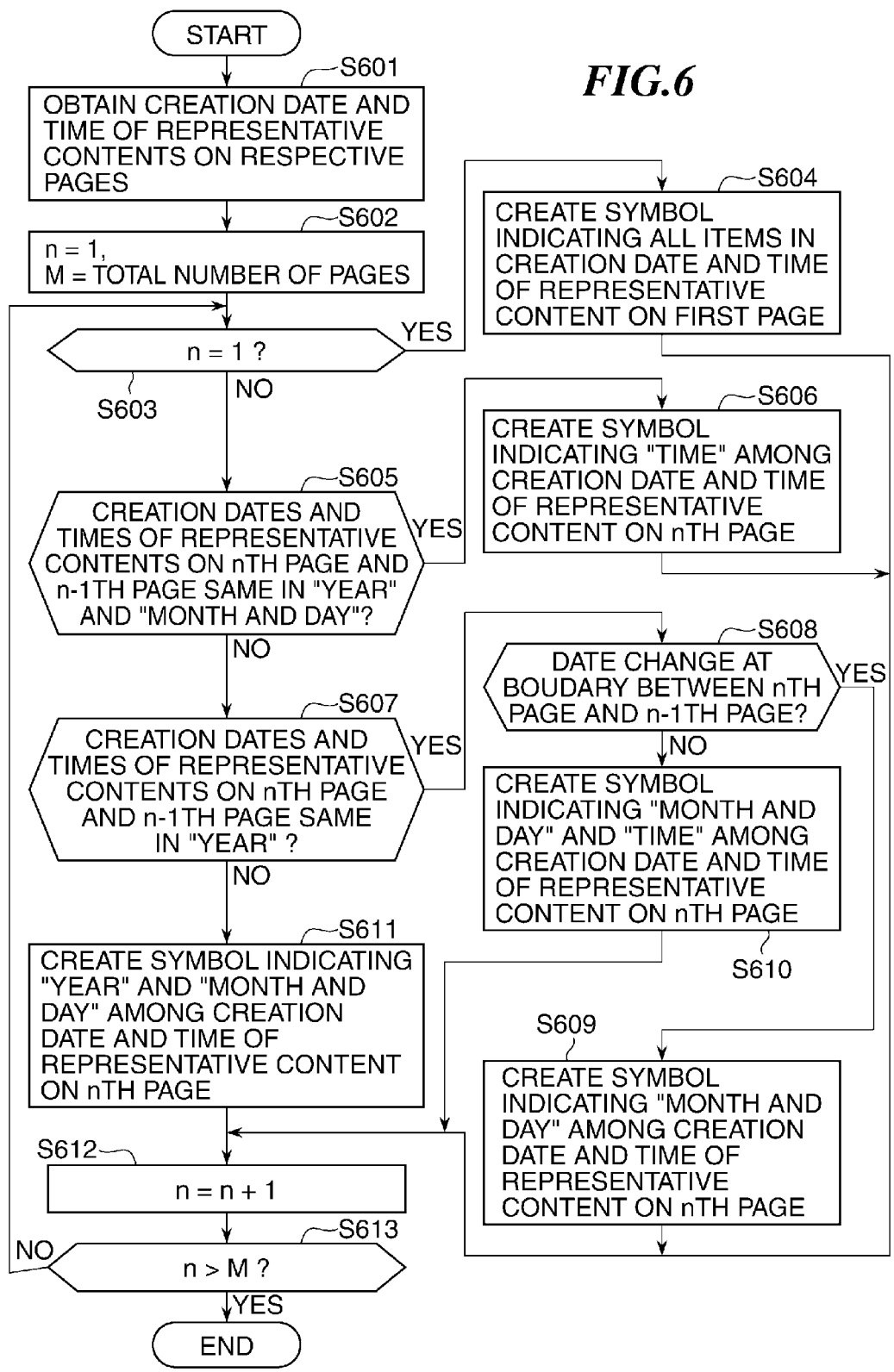
FIG. 6 is a flowchart of a process in which the creation date and time of a representative content in FIG. 5 is displayed as a page switching symbol.
Figure 7:
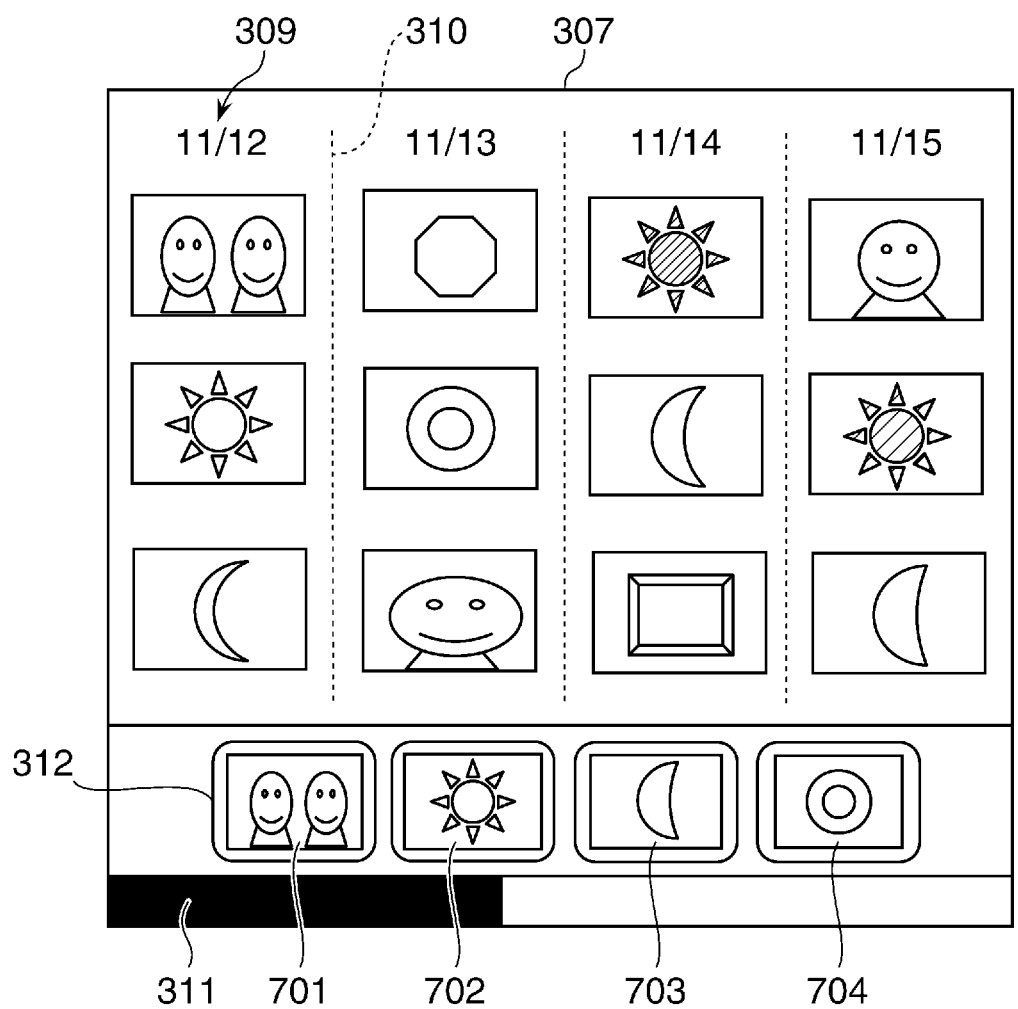
FIG. 7 is a diagram showing a display example in which a representative content is used as a page switching symbol in the page switching symbol display process in the step S207 appearing in FIG. 2.

Referring now to FIGS. 5 to 7, a description will be given of the symbol display process in the step S207. In the following description, symbols displayed on the display 106 in the step S207 will be referred to as "page switching symbols".

FIG. 5 is a diagram showing a display example in which the creation dates and times of a representative content are used as page switching symbols displayed in a manner being superposed on the page switching tabs 312. The CPU 101 displays representative content attribute information, which is held on the RAM 102, as page switching symbols on the page switching table 312, which has been described with reference to FIG. 3, in a superposed manner. Referring to FIG. 5, a page switching symbol 501 for the first page, a page switching symbol 502 for the second page, a page switching symbol 503 for the third page, and a page switching symbol 504 for the fourth page are displayed on the respective four page switching tabs 312.

FIG. 6 is a flowchart of a process in which the creation date and time of representative contents in FIG. 5 are displayed as page switching symbols. In step S601, the CPU 101 obtains the creation dates and times of representative contents on respective pages from representative content attribute information held on the RAM 102.

Next, the creation dates and times of representative contents (first contents) on the present page (n) and the previous page (n–1) are compared with each other. This process is repeatedly carried out until the present page (n) is the last page (the total number of pages: M) (steps S602 to S607).

Specifically, in the step S602, the CPU 101 sets the first page (n–1) as the present page and obtains the total number of pages (M). In step S603, the CPU 101 determines whether or not n=1. When n=1 (YES in the step S603), the process proceeds to the step S604, and when n≠1 (NO in the step S603), the process proceeds to the step S605.

In the step S604, because there is no previous page and there is no target for comparison, the CPU 101 displays all of items "year", "month and day", and "time" in the creation date and time of a representative content as a page switching symbol for the first page.

Next, in the step S605 which is a process for the second and subsequent pages, when comparing the creation dates and times of the representative contents on the nth page and the n–1th page, the CPU 101 compares them in terms of "year" and "month and day" in this order and determines whether or not they are same in "year" and "month and day".

When, as a result of the comparison, they are same in "year" and "month and day" (YES in the step S605), the process proceeds to the step S606, and when they are same in "year" but different in "month and day" (NO in the step S605), the process proceeds to the step S607.

In the step S606, the creation dates and times of the representative contents on the nth page and the n–1th page are same in "year" and "month and day", and the creation dates and times of a representative content (first content) on the nth page and a last content on the n–1th page are also same in "year" and "month and day". For this reason, the CPU 101 omits display of "year" and "month and day" for a page switching symbol for the nth page and creates a page switching symbol including only "time". This enables the user to easily recognize that the representative content on the nth page and the last content on the n–1th page are same in "year" and "month and day" and differ only in "time"

In the step S607, when comparing the creation dates and times of the representative contents on the nth page and the n–1th page, the CPU 101 determines whether or not they are same in "year". When they are same in "year" (YES in the step S607), the process proceeds to step S608, and when they are different in "year" (NO in the step S607), the process proceeds to step S611.

In the step S608, the CPU 101 determines whether or not date changes at a boundary between the nth page and the n–1th page. This determination is made by determining whether or not the creation date of the last content on the n–1th page is the same as the creation date of the representative content on the nth page. When date changes (YES in the step S608), the process proceeds to step S609, and when date does not change (NO in the step S608), the process proceeds to step S610.

In the step S609, as a page switching symbol for the representative content on the nth page, the CPU 101 creates a page switching symbol indicative of "month and day" of the creation date and time of the representative content on the nth page. By thus omitting "year" and "time", it can be made clear that the representative content (first content) on the nth page and the last content on the n–1th page are same in "year" but differ in "month and day".

In the step S610, as a page switching symbol for the nth page, the CPU 101 creates a page switching symbol indicative of "month and day" and "time" of the creation date and time of the representative content on the nth page. By thus omitting only "year", it can be made clear that the representative content (first content) on the nth page and the last content on the n–1th page are same in "year" and "month and day" but differ in "time".

In the step S611, as a page switching symbol for the nth page, the CPU 101 creates a page switching symbol indicative of "year" and "month and day" of the creation date and time of the representative content on the nth page. As a result, it can be made clear that contents on the n–1th page were created between the creation date and time of the representative content on the n–1th page and the creation date and time of the representative content on the nth page.

It should be noted that in the present embodiment, when the determination result in the step S607 is "NO", the step S611 is immediately executed, but when the determination result in the step S607 is "NO", it may be determined next whether or not date changes at the boundary between n–1th page and the nth page. When date changes, the same process as in the step S611 is carried out to made it clear that the creation date and time of the last content on the n–1th page differs from the creation date and time of the representative content on the nth page. On the other hand, when date does not change, as a page switching symbol for the nth page, the CPU 101 creates a page switching symbol indicative of all of "year", "month and day", and "time" of the creation date and time of the representative content on the nth page. This can make it clear that the creation date and time of the last content on the n−1th page and the creation date and time of the representative content on the nth page are the same.

In step S612 after completion of the steps S604, S606, S609, S610, and S611, the CPU 101 increments page. In the next step S613, the CPU 101 determines whether or not there is a new page which is the present page, namely, whether or not processing on the last page has been completed. When there is any page that is a target for comparison (NO in the step S613), the process returns to the step S603, and when there is no page that is a target for comparison (YES in the step S613), the process is brought to an end.

The process carried out in accordance with the flowchart of FIG. 6 will now be described using a concrete example. Assume that the creation dates and times of representative contents on respective pages and the creation dates and times of the last contents on the respective pages are as follows:

the creation date and time of a representative content on the first page: 23:48, Nov. 12, 2011 the creation date and time of a representative content on the second page: 22:20, Nov. 23, 2011 the creation date and time of a representative content on the third page: 13:20, Jan. 1, 2012 the creation date and time of a representative content on the fourth page: 20:10, Jan. 1, 2012 the creation date and time of the last content on the first page: 11:50, Nov. 23, 2011 the creation date and time of the last content on the second page: 10:50, Dec. 30, 2011 the creation date and time of a representative content on the third page: 15:40, Jan. 1, 2012

In this case, a page switching symbol 501 for the first page is displayed as "23:48 11/12 2011" in accordance with the step S604. For the second page, when the creation dates and times of representative contents on the second page and the first page are compared with each other, they are same in "year" but differ in "month and day". Because the creation dates and times of a representative content on the second page and the last content on the first page are the same, i.e. November 23, date does not change at a boundary between the pages. Therefore, for a page switching symbol 502 for the second page, "month and day" and "time" are set as items to be displayed, and the page switching symbol 502 is displayed as "22:20 11/23" in accordance with the step S610.

For the third page, when the creation dates and times of representative contents on the third page and the second page are compared with each other, they are different in both "year" and "month and day", and hence a page switching symbol 503 for the third page is displayed as "1/1 2012" in accordance with the step S611. It should be noted that the creation date and time of a representative content on the third page and the creation date and time of the last content on the second page are different. Thus, the page switching symbol 503 for the third page is displayed as "1/1 2012" even in a case where it is determined whether or not the date changes at the boundary between the n−1th page and the nth page when the determination result in the step S607 is "NO".

For the fourth page, when the creation dates and times of representative contents on the fourth page and the third page are compared with each other, they are same in "year" and "month and day", and hence a page switching symbol 504 for the fourth page is displayed as "20:10" in accordance with the step S606.

As described above, because page switching symbols indicative of the creation dates and times of representative contents are displayed in a manner being superposed on the page switching tabs 312, boundary dates and times between pages are made clear. Therefore, the user can easily go to a page on which a desired content is stored and easily find the desired content.

It should be noted that although in the present embodiment, items are not displayed so that the creation dates and times of contents (the dates and times of shooting) can be more intuitively identified. Also, those items may be displayed in a different display form such as gray out. Also, items of date and time may be increased or decreased to, for example, only "year", only "year" and "month", or "year", "month", "day", "hour", "minute", and "second". Moreover, although in the present embodiment, page switching symbols are displayed in a manner being superposed on the page switching tabs 312, this is not limitative, but for example, page switching symbols may be displayed near the page switching tabs 312. Namely, page switching symbols can be displayed in any display form as long as the correspondence between the page switching tabs 312 and page switching symbols can be easily identified.

FIG. 7 is a view showing an example in which representative contents are displayed as page switching symbols displayed in a manner being superposed on the page switching tabs 312. Here, the representative contents are images as with FIG. 3. Referring to FIG. 7, an image of a representative content on the first page is displayed as a page switching symbol 701 in a manner being superposed on the page switching tab 312 for the first page. An image of a representative content on the second page is displayed as a page switching symbol 702 in a manner being superposed on the page switching tab 312 for the second page. An image of a representative content on the third page is displayed as a page switching symbol 703 in a manner being superposed on the page switching tab 312 for the third page. An image of a representative content on the fourth page is displayed as a page switching symbol 704 in a manner being superposed on the page switching tab 312 for the fourth page.

Because images of representative contents are thus displayed as page switching symbols, the user can go to a page, on which a desired content is stored, intuitively based on the image, and as a result, the user can easily find the desired content.

It should be noted that page switching symbols displayed in a manner being superposed on the page switching tabs 312 in FIGS. 5 and 7 may not be displayed at all times but may be displayed as pop-up only when there is a focus by a mouse cursor and the like. In this case, it is preferred that not only the creation date and time of a representative content, which is at the top of a page, but also the creation date and time of the last content on this page is displayed.

It should be noted that although in the above description of the present embodiment, date and time information is taken up as exemplary attribute information on contents, the present invention is not limited to this, but the present invention may be realized using other information as long as the information includes items having a hierarchical structure. For example, the present invention may be realized using even location information having items such as areas, countries, prefectures, and municipalities may be used. In this case, contents are classified in alphabetical order from an upper level with respect to character data stored in items.

In the embodiment described above, the information processing apparatus manages content files, and generates and displays a screen showing a list of the content files. The present invention, however, is not limited to this, but the information processing apparatus may be configured to manage content files, generate a screen showing a list of the content files, and then send the screen showing the list of the content files to an external apparatus via a network such as the Internet, and the external apparatus may display the screen showing the list of the content files.

Moreover, in the embodiment described above, one CPU 101 carries out the processes in the flowchart of FIG. 2 by controlling the component elements of the information processing apparatus. The present invention, however, is not limited to this, but an information control system may be comprised of a plurality of processing units tailored to the processes in the flowchart of FIG. 2, and the processing units may work in conjunction with one another to control the overall operation of the information control system and carry out the processes in the flowchart of FIG. 2.

Further, although in the embodiment described above, the present invention is applied to a personal computer, this is not limitative, but the present invention may be applied to an arbitrary information processing apparatus capable of displaying a plurality of contents. For example, the present invention may be applied to a digital camera, a digital video camera, a PDA, a cellular phone terminal, a digital photo frame, or the like as well.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-225021 filed Oct. 10, 2012, which is hereby incorporated by reference herein in its entirety.

What is claimed is:

1. An information processing apparatus comprising:
a processor; and
a memory storing a program which, when executed by the processor, causes the information processing apparatus to:
classify a plurality of contents into a plurality of groups based on attribute information on the contents;
display a plurality of tabs corresponding to the groups;
compare first attribute information regarding creation date and time of a first content classified into a first group corresponding to a first tab and second attribute information regarding creation date and time of a second content classified into a second group corresponding to a second tab that is displayed next to the first tab;
select at least one item included in the attribute information not shared between the first attribute information and second attribute information based on a result of the comparison for each of the tabs; and
display a piece of information corresponding to the selected item of the attribute information of the content belonging to the group corresponding to the tab on each of the tabs.

2. The information processing apparatus according to claim 1, wherein each of the first content and the second content is a first or last content based on the attribute information among the plurality of contents classified into each of the first group and the second group.

3. The information processing apparatus according to claim 1, wherein the program, when executed by the processor, further causes the information processing apparatus to:
select one of the displayed tabs;
display, in a predetermined display area, contents belonging to a group corresponding to the selected tab; and
in response to a scrolling operation by a user, change contents to be displayed in the predetermined display area among the contents belonging to the group corresponding to the selected tabs.

4. A control method for an information processing apparatus, comprising:
a classification step of classifying a plurality of contents into a plurality of groups based on attribute information on the contents;
a tab display step of displaying a plurality of tabs corresponding to the groups;
a comparison step of comparing first attribute information regarding creation date and time of a first content classified into a first group corresponding to a first tab and second attribute information regarding creation date and time of a second content classified into a second group corresponding to a second tab that is displayed next to the first tab;
a selection step of selecting at least one item included in the attribute information not shared between the first attribute information and second attribute information based on a result of the comparison for each of the tabs; and
a display step of displaying a piece of information corresponding to the selected item of the attribute information of the content belonging to the group corresponding to the tab on each of the tabs.

5. A non-transitory computer-readable storage medium storing a program for causing a computer to execute a control method for an information processing apparatus, the control method comprising:
a classification step of classifying a plurality of contents into a plurality of groups based on attribute information on the contents;
a tab display step of displaying a plurality of tabs corresponding to the groups;
a comparison step of comparing first attribute information regarding creation date and time of a first content classified into a first group corresponding to a first tab and second attribute information regarding creation date and time of a second content classified into a second group corresponding to a second tab that is displayed next to the first tab;
a selection step of selecting at least one item included in the attribute information not shared between the first attribute information and second attribute information based on a result of the comparison for each of the tabs; and a display step of displaying a piece of information corresponding to the selected item of the attribute information of the content belonging to the group corresponding to the tab on each of the tabs.

* * * * *